June 2, 1942.  C. PAULSON  2,285,352

ELECTRICAL CONTACT

Filed June 10, 1939

INVENTOR
C. PAULSON
BY Emery Robinson.
ATTORNEY

UNITED STATES PATENT OFFICE 2,285,352

ELECTRICAL CONTACT

Christian Paulson, Elmhurst, Ill., assignor to Western Electric Company, Incorporated, New York, N. Y., a corporation of New York Application June 10, 1939, Serial No. 278,402

8 Claims. (Cl. 200—87)

This invention relates to electrical contacts and more particularly to magnetized electrical contacts for use in electrical relays.

In the manufacture of relays, particularly the meter type relays of the general type disclosed in the patent to Lamb 2,062,915, issued December 1, 1936, it has been found desirable to magnetize the stationary contact of the relay in order to insure a good engagement of the movable contact with the fixed contact.

It has been the practice, in the manufacture of relays of this type, to make the stationary contact a relatively strong magnet as compared with the size of the magnet, which, of course, is limited by the size of the apparatus with which it is associated, and there has been some difficulty experienced in that the readings made by the meter were not as fine as might be desired due to the fact that the magnetic attraction of the fixed magnetized contact would tend to draw the pointer or movable contact of the relay into engagement with it while the movable contact is still some distance removed from the fixed magnetized contact.

It is an object of the present invention to provide a magnetic contact whereby finer readings may be made by the instrument in which the contact is used.

In accordance with one embodiment of the invention, the fixed contacts of the meter type relay are magnetized and are surrounded with a soft iron cup-shaped member which provides a return magnetic path whereby the magnetic field of the magnetized contact is flattened and strengthened.

Figure 1:
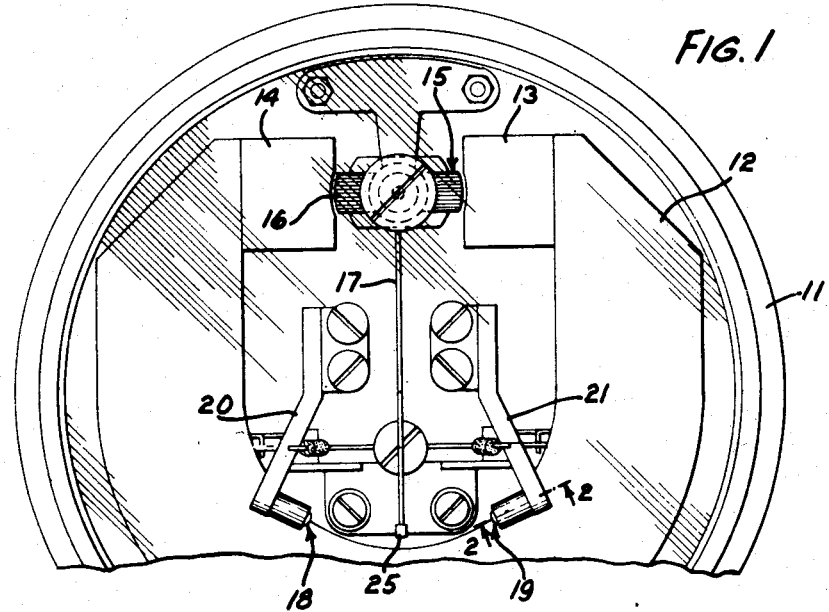
Figure 2:
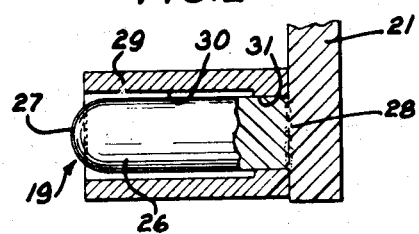
Figure 3:
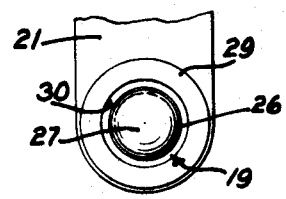

A better understanding of the invention will be had by reference to the accompanying drawing, wherein Fig. 1 is a front elevational view of a meter type relay equipped with magnetized contacts made in accordance with the present invention;

Fig. 2 is a fragmentary sectional view on an enlarged scale, taken on the line 2—2 of Fig. 1 in the direction of the arrows and showing a contact formed in accordance with the present invention, and Fig. 3 is an end elevational view of the contact shown in section in Fig. 2.

Referring to the drawing, wherein like reference characters designate the same parts throughout the several views, the numeral 11 indicates generally a casing of the meter type relay, in which there is mounted a permanent magnet 12, having pole pieces 13 and 14 between which a meter moving system 15 is pivotally mounted. The moving system 15 comprises, among other elements, a coil 16 having a pointer 17, the pointer being in the form of a metallic member connected by means of the usual flexible connecting wire, not shown, to a terminal, not shown, of the relay and being adapted to complete a circuit to either one of a pair of fixed contacts 18 or 19. The contacts 18 and 19 are mounted upon brackets 20 and 21, respectively, suitably insulated from the remaining elements of the relay and connected to terminals, not shown.

The pointer 17 carries, at its lower end, a magnetic rider 25, which is adapted to engage either one or the other of the contacts 18 or 19, depending upon the direction in which the moving system of the relay is moved. This magnetic rider will, when the pointer 17 is moved close to one of the contacts 18 or 19, be attracted to the contact and will be held in engagement therewith since the contact comprises a permanent magnetic portion 26 on which there is suitably fixed, for example, by welding, a precious metal contact point 27. The permanent magnet portion 26 of the contact is fixed to the bracket 21 in any suitable manner, for example, by brazing or welding, as shown at 28, and after the contact 19 has been formed and mounted on the bracket 21, a cup-shaped member 29 of soft magnetic iron is placed on the contact. The member 29 has a bore 30 of slightly larger diameter than the diameter of the permanent magnet portion 26 of the contact and has an aperture 31 of approximately the same diameter as the portion 26 so that when the member 29 is forced onto the portion 26, it will grip it and stay in the position shown. A contact equipped with the soft iron sleeve 29 will provide a return magnetic path from the free tip of the magnetized portion 26 to the portion thereof which is fixed to the bracket 21, whereby the magnetic field of the magnet will be concentrated in the area adjacent the tip and in this manner the magnetic rider 25 on the pointer 17 will not be attracted into engagement with the free end of the contact until the rider is moved quite close to the contact, and when the magnetic rider 25 engages the contact 19, it will be held thereagainst.

Although a specific type of sleeve or magnetic return member has been described hereinbefore, it will be understood that any suitably shaped member may be provided without departing from the scope of the invention, which is to be limited only by the appended claims.

What is claimed is:

1. In an electrical circuit closing device, a permanently magnetized contact, and a magnetic return member mounted closely adjacent said magnetized contact for limiting the field of magnetic attraction of the magnet.

2. A circuit closing apparatus including a permanently magnetized contact, and a magnetic return member surrounding a substantial portion of said contact to reduce the field of magnetic attraction of said magnetized contact.

3. In a circuit closing device having a contact of magnetic material, a permanently magnetized contact for holding the contact of magnetic material in engagement with it, and a member of magnetic material engaging one end of said magnetized contact and extending to a point adjacent the other end of said magnetized contact.

4. In a circuit closing device, a pair of contacts, one of which is permanently magnetized and the other of which is made of magnetic material, and a magnetic return member of magnetic material mounted to provide a return magnetic path from one end of said magnetized contact to the other end thereof.

5. In a circuit closing device, a pair of contacts, one of which is permanently magnetized and the other of which is made of magnetic material, a cup-shaped member surrounding the magnetized contact and having a portion thereof engaging the magnetized contact adjacent one of its end portions.

6. In a circuit closing device, a pair of contacts, one of which is permanently magnetized and the other of which is made of magnetic material, a cup-shaped member surrounding the magnetized contact and having a portion thereof engaging the magnetized contact adjacent one of its end portions and having a portion thereof closely adjacent the other of said portions to provide a return magnetic path for the magnetic flux of the magnetized contact.

7. In a circuit closing device, a permanently magnetized contact, a member of magnetic material surrounding said contact through most of its length and engaging said contact adjacent one of its end portions to flatten and strengthen the field of magnetic attraction thereof at the other portion.

8. In a circuit closing device, a pair of contacts, one of which is permanently magnetized and the other of which is made of magnetic material, and a tubular sleeve surrounding the magnetized contact and spaced therefrom at the contact end and throughout most of the length thereof and in engagement with the magnetic contact opposite its contact end.

CHRISTIAN PAULSON.